United States Patent
Nakawaki

(10) Patent No.: US 9,965,299 B2
(45) Date of Patent: May 8, 2018

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Jun Nakawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 14/863,084

(22) Filed: Sep. 23, 2015

(65) Prior Publication Data

US 2016/0092281 A1    Mar. 31, 2016

(30) Foreign Application Priority Data

Sep. 25, 2014  (JP) ................................ 2014-195160

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/445 | (2018.01) | |

(52) U.S. Cl.
CPC ............ *G06F 9/44505* (2013.01); *G06F 8/61* (2013.01); *G06F 8/665* (2013.01)

(58) Field of Classification Search
None
See application file for complete search history.

(56) References Cited

U.S. PATENT DOCUMENTS

| | | | | |
|---|---|---|---|---|
| 2004/0010795 A1* | 1/2004 | Sasaki | ................... | G06F 9/4411 719/321 |
| 2005/0010898 A1* | 1/2005 | Ogawa | ..................... | G06F 8/51 717/106 |
| 2015/0067671 A1* | 3/2015 | Kamiya | ................... | G06F 8/61 717/174 |

FOREIGN PATENT DOCUMENTS

JP         2010-143111 A     7/2010

* cited by examiner

*Primary Examiner* — Chat Do
*Assistant Examiner* — William C Wood
(74) *Attorney, Agent, or Firm* — Canon USA, Inc. I.P. Division

(57) ABSTRACT

An information processing apparatus includes a generation unit configured to generate a second script for setting the specified setting value, and an execution unit configured to execute a first script using the work setting value and the plurality of setting values to be set excluding the specified setting value, wherein the execution unit executes the generated second script after executing the first script.

8 Claims, 20 Drawing Sheets

```xml
<? xml version="1.0" encoding="utf-8"?>
<IScript xmlns:xsi="http://www.XXX.com/XMLSchema">
    <deviceId>
        <id> 12345678100 abc</id>
    </deviceId>
    <comment> Installtion script for MFP100</comment>             ─ 1001

<!-- Installation Script Commands -->
    <commands>
        <!-- Import device configuration files -->
        <importDeviceConig Command order="1">
            <relativeDirPath> DevConfig</relativeDirPath>
            <config FileName> deviceConfigurationFile.zip</config FileName>   ─ 1007
        </importDeviceConig Command>

<!-- Update Firmware-->
        <updateFirmwareCommand order="2">
            <relativeDirPath>Firmware </relativeDirPath>
            <firmwareName> Firmware_v1.0.1.zip</firmwareName>                 ─ 1003a
        </updateFirmwareCommand>

<!-- Install applications -->
        <install Application Command order="3">
            <relativeDirPath>App</relativeDirPath>
            <App FileName> Application001.jar</App FileName>
            <licenseRelativeDirPath>App</licenseRelativeDirPath>              ─ 1004a
            <licenseFileName>App001-License.lic</licenseFileName>
        </install Application Command>

<!-- Start applications-->
        <startApplication Command order="4">
            <appId>1a2b3c4d-5e6f-6413-adee-00e0032fab94c</appId>              ─ 1005
        </startApplicationCommand>

<!-- Activate embedded functions -->
        <activate EmbeddedFunction Command order="5">
            <relativeDirPath> EmbeddedFunc</relativeDirPath>
            <licenseFileName>EmbeddedFunc-License.lic</licenseFileName>
        </activate EmbeddedFunction Command>

</commands>                                                               1006a
</IScript>
```

```xml
<updateFirmwareCommand order="1">
    <contentsServer>Http://contents-server.com/</contentsServer>      ─ 1003b
    <firmwareVersion>20.01</firmwareVersion>
</updateFirmwareCommand>
```

```xml
<install Application Command order="2">
    <contentsServer>Http://contents-server.com/</contentsServer>
    <licenseServer>Http://license-server.com/</licenseServer>         ─ 1004b
    <applicationName> Application Name </applicationName>
    <applicationVersion>1.0</applicationVersion>
</install Application Command>
```

```xml
<activate EmbeddedFunction Command order="4">
    <licenseServer>Http://license-server.com/</licenseServer>         ─ 1006b
    <functionId>zbdkro4w6n2</functionId>
</activate EmbeddedFunction Command>
```

```xml
<?xml version="1.0" encoding="utf-8"?>
<workAreaConfig xmlns:xsi="http://www.w3.org/2001/XMLSchema">
 <environment>
   <network usage="auto">
    <ipv4>
      <ipaddress>172.24.17.17</ipaddress>
      <subnetmask>255.255.248.0</subnetmask>
      <gateway>172.24.0.11</gateway>
      <dhcp>off</dhcp>
    </ipv4>
    <proxy>
      <enable>true</enable>
      <address>http://proxyserver.com/</address>
    </proxy>
   </network>                                        ⎫ 1101
   <usbstorage usage="auto">
      <use>allow</use>
   </usbstorage>                                     ⎫ 1102
   <timer usage="force">
     <sleepTime>100</sleepTime>
   </timer>                                          ⎫ 1103
 </environment>
 <management usage="force">
   <administrator>admin</administrator>
   <password>1234</password>
 </management>                                       ⎫ 1104
</workAreaConfig>
```

1100

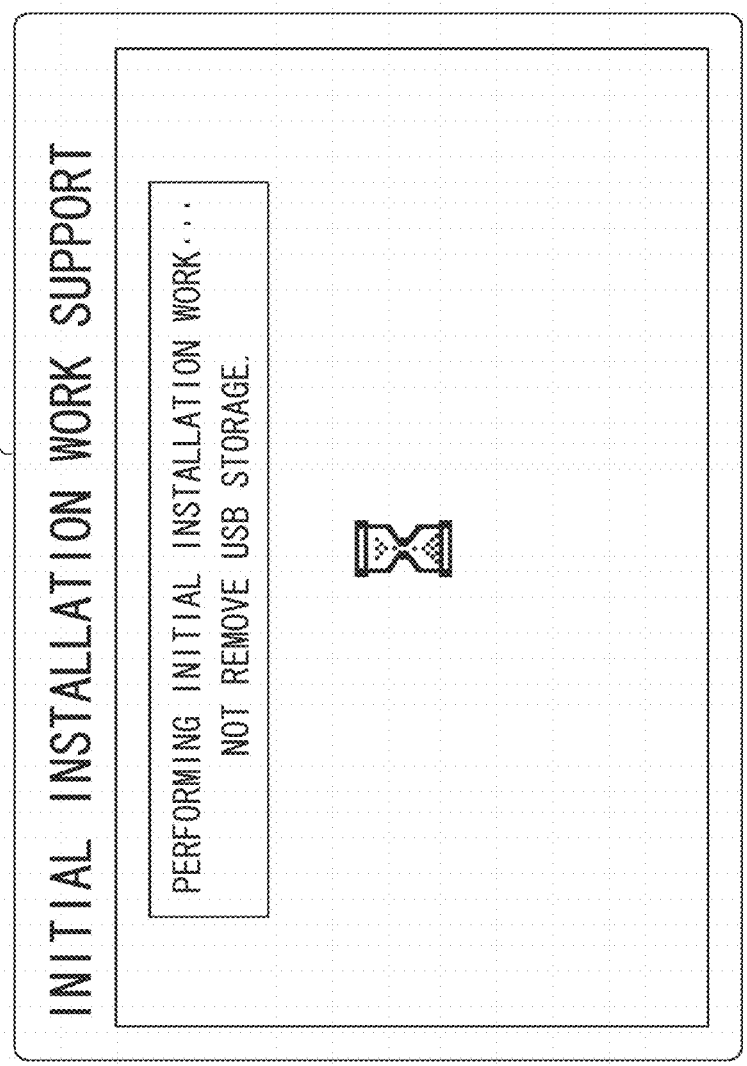

FIG. 15

```xml
<?xml version="1.0" encoding="utf-8"?>
<config xmlns:xsi="http://www.w3.org/2001/XMLSchema">
 <environment>
  <network>
   <ipv4>
    <ipaddress>0.0.0.0</ipaddress>
    <subnetmask>0.0.0.0</subnetmask>
    <gateway>0.0.0.0</gateway>
    <dhcp>on</dhcp>
   </ipv4>
   <proxy>
    <enable>true</enable>
    <address>http://myserver.com/</address>
   </proxy>
  </network>
  <usbstorage>
    <use>block</use>
  </usbstorage>
  <timer>
    <sleepTime>10</sleepTime>
  </timer>
  <areaName>3F OA space</areaName>
 </environment>
 <display>
  <language>Japanese</language>
  <background>cloud.png</background>
  <buttons>3</buttons>
  <defaultApplication>copy</defaultApplication>
 </display>
 <management>
  <administrator>admin</administrator>
  <password>n5Ko394h</password>
 </management>
</config>
```

- 1500 (overall)
- 1501: network block
- 1502: usbstorage block
- 1503: timer block
- 1504: areaName
- 1505: display block
- 1506: management block

```
<?xml version="1.0" encoding="utf-8"?>
<delayConfig xmlns:xsi="http://www.w3.org/2001/XMLSchema">
 <environment>
   <usbstorage>
     <use>block</use>                              } 1602
   </usbstorage>
   <timer>
     <sleepTime>10</sleepTime>                     } 1603
   </timer>
 </environment>
 <management>
   <administrator>admin</administrator>
   <password>nSKo394h</password>                   } 1604
 </management>
</delayConfig>
```

1600b

```
<?xml version="1.0" encoding="utf-8"?>
<delayConfig xmlns:xsi="http://www.w3.org/2001/XMLSchema">
 <environment>
   <network>
    <ipv4>
      <ipaddress>0.0.0.0</ipaddress>
      <subnetmask>0.0.0.0</subnetmask>
      <gateway>0.0.0.0</gateway>
      <dhcp>on</dhcp>                              } 1601
    </ipv4>
    <proxy>
      <enable>true</enable>
      <address>http://myserver.com/</address>
    </proxy>
   </network>
   <usbstorage>
     <use>block</use>                              } 1602
   </usbstorage>
   <timer>
     <sleepTime>10</sleepTime>                     } 1603
   </timer>
 </environment>
 <management>
   <administrator>admin</administrator>
   <password>nSKo394h</password>                   } 1604
 </management>
</delayConfig>
```

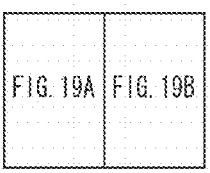

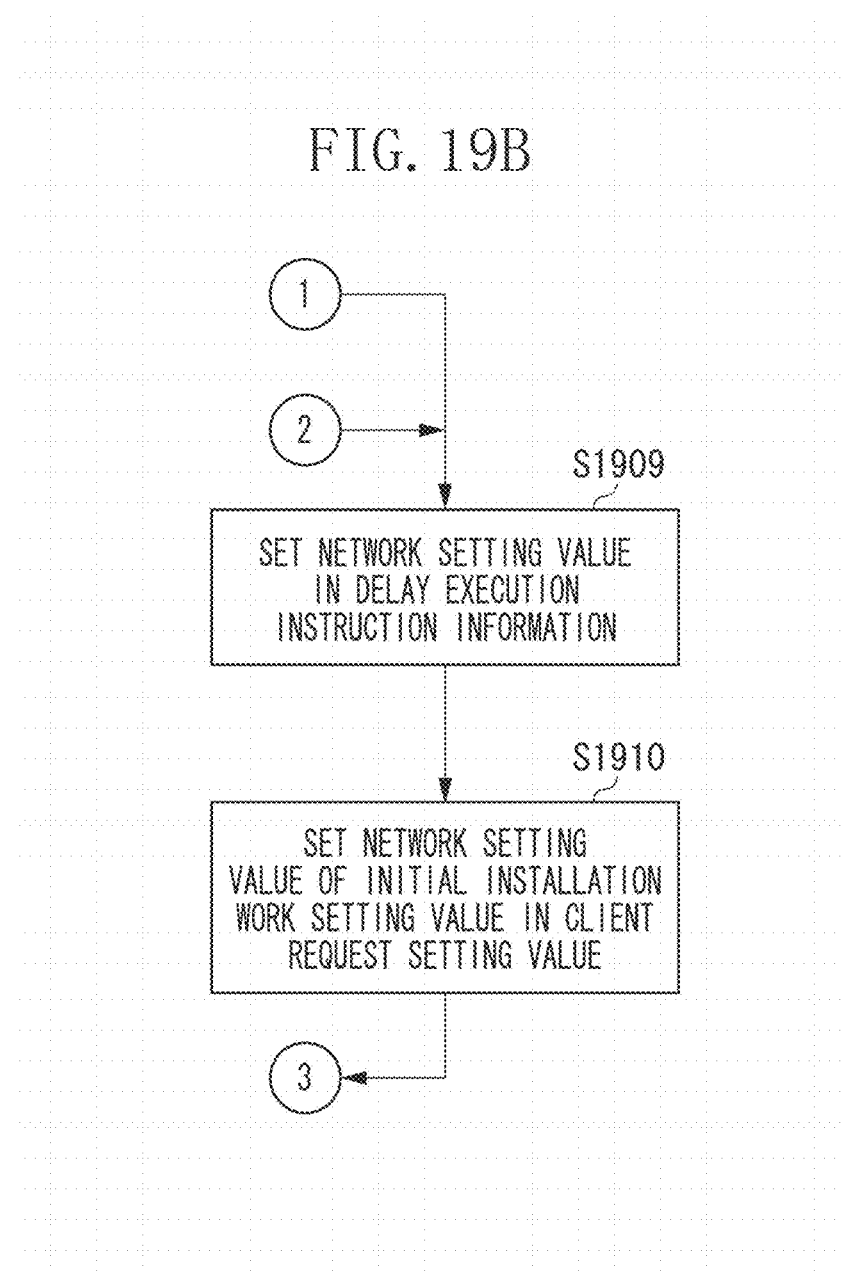

INFORMATION PROCESSING APPARATUS, METHOD FOR CONTROLLING THE SAME, AND STORAGE MEDIUM

BACKGROUND OF THE INVENTION

Field of the Invention

The present invention relates to an information processing apparatus and a method for controlling the information processing apparatus.

Description of the Related Art

When an image forming apparatus is newly introduced into a client site, initial installation work for an image forming apparatus needs to be previously performed depending on its use environment. The initial installation work includes work, for example, attachment of a hardware option, such as a finisher for finishing a printed product, setting of a control program for the image forming apparatus, activation of a license of an extended function, and installation of an expansion program.

As the expansion program, a system with which an add-in to a program for the image forming apparatus is enabled and a vendor can extend a function of the image forming apparatus is popular. This type of system includes MEAP (registered trademark) manufactured by Canon Inc.

A program for storing installation instruction information including an execution procedure for initial installation work, a control program, and an expansion program are stored in a portable storage medium and the portable storage medium is inserted into an image forming apparatus as a target of the initial installation work, so that a program automatically performs the initial insulation work according to the installation instruction information.

An installation instruction information management system (hereinafter referred to as "management system") for generating and managing installation instruction information designates the order of instillation instructions and setting value information required for the installation instructions, an expansion program, and license information. The installation instruction information as a target of initial installation work is stored in a portable storage medium.

Japanese Patent Application Laid-Open No. 2010-143111 discusses a method for setting a setting value dedicated to initial insulation work by using a client personal computer (PC). With such a technique, an image forming apparatus and the client PC can be connected to each other only using Peer2Peer, and the image forming apparatus cannot be connected to an external server.

Among setting values requested by a client, a setting value corresponding to a setting item that causes initial installation work not to be implemented if the setting value is set, differs depending on an installation work method. Therefore, in a conventional technique, an operator is required to previously determine the setting item that causes the initial installation work not to be implemented, and prepare setting values to be used during the initial installation work.

For example, if a setting value for inhibiting the client from using a portable storage medium is set, installation using installation instruction information stored in the portable storage medium cannot be performed in the initial installation work.

In a case where installation instruction information required for the initial installation work is stored in an external server, and the installation instruction information is referred to for the initial installation work, and if an Internet Protocol (IP) address of the external server in a use environment of the client is set, installation cannot be correctly performed.

Conventionally, in a case where the initial installation work is performed using the portable storage medium or the external server, an operator is required to generate an installation instruction information by taking into consideration of the order of installation instructions so that the setting value does not affect the initial installation work, which is significantly complicated and difficult.

SUMMARY OF THE INVENTION

The present invention is directed to a technique for generating installation instruction information without consideration of where a storage location of the installation instruction information is stored.

According to an aspect of the present invention, an information processing apparatus includes a first specifying unit connected to a storage device configured to store a work setting value, a plurality of setting values to be set in the information processing apparatus, and a first script for setting the plurality of setting values to be set in the information processing apparatus and configured to search for the first script and specify a storage unit configured to store the first script, a second specifying unit configured to specify, from among the plurality of setting values to be set in the information processing apparatus, a setting value relating to the specified storage unit configured to store the first script, a generation unit configured to generate a second script for setting the specified setting value, and an execution unit configured to execute the first script using the work setting value and the plurality of setting values to be set excluding the specified setting value, wherein the execution unit executes the generated second script after executing the first script.

Further features of the present invention will become apparent from the following description of exemplary embodiments with reference to the attached drawings.

BRIEF DESCRIPTION OF THE DRAWINGS

FIG. 10 is a diagram illustrating a script included in installation instruction information.

FIG. 11 is a diagram illustrating an initial installation work setting value.

FIG. 14 is a diagram illustrating a screen during execution of a script by a support program.

FIG. 15 is a diagram illustrating a client request setting value.

FIG. 16 is a diagram illustrating delay execution instruction information.

FIG. 19 is a diagram including the flowcharts of FIGS. 19A and 19B. FIGS. 19A and 19B are flowcharts illustrating processing for generating delay execution instruction information.

DESCRIPTION OF THE EMBODIMENTS

An image forming apparatus according to an exemplary embodiment for implementing an information processing apparatus according to the present invention will be described below with reference to the drawings. The following exemplary embodiment is not to limit the invention as set forth in claims, and all combinations of features described in the exemplary embodiment are not necessarily indispensable to a unit for solving the invention.

<<Entire System Configuration>>

Figure 1:
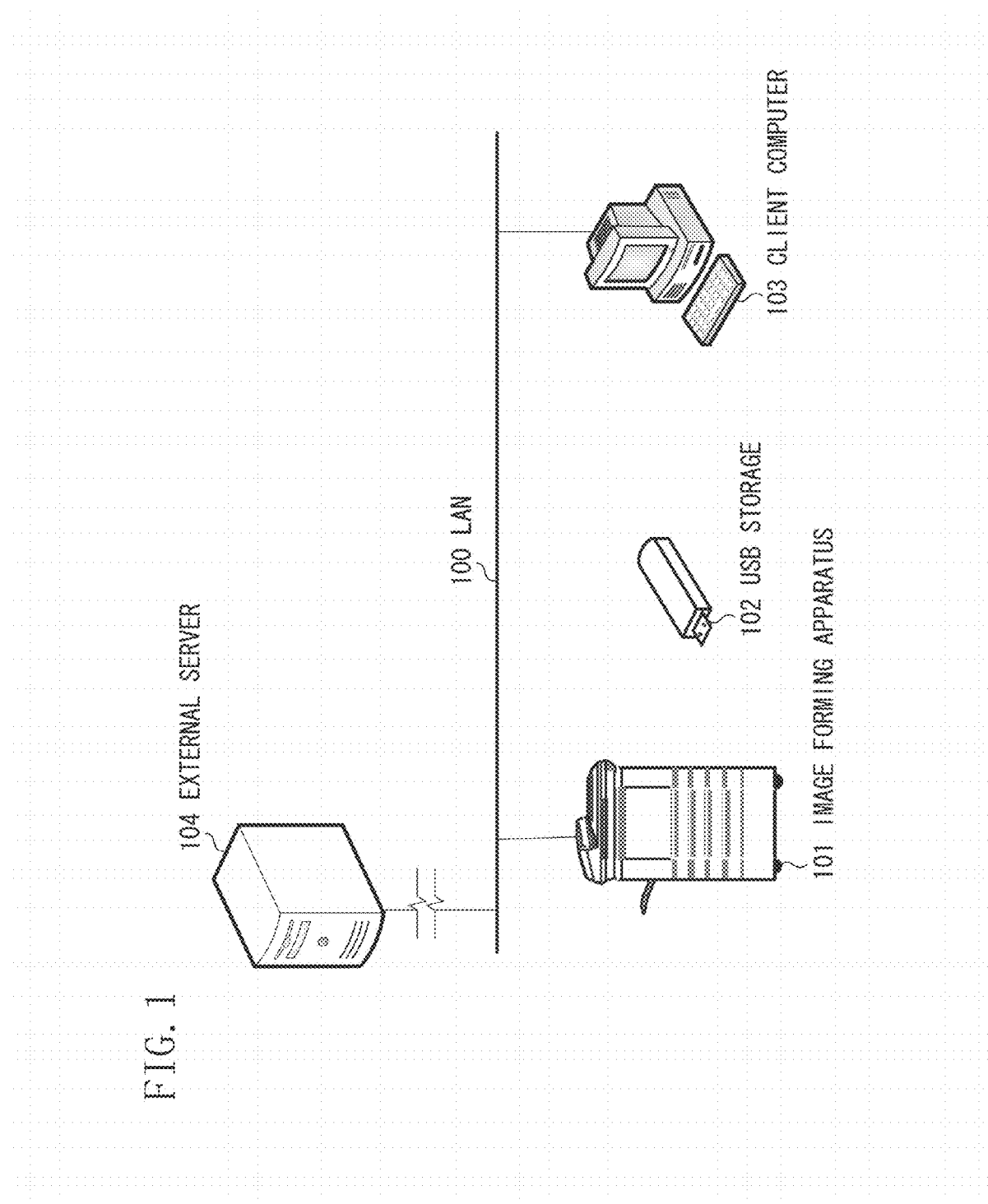
FIG. 1 is an overall view illustrating a device configuration of a management system.

FIG. 1 is a diagram illustrating an example of a device configuration of a management system including an image forming apparatus according to the present exemplary embodiment of the invention.

The management system includes an image forming apparatus 101, a client computer 103, and an external server 104 which is connected to the image forming apparatus 101 so as to communicate with each other. The image forming apparatus 101, the client computer 103, and the external server 104 are connected to a local area network (LAN) 100. Further, a portable storage medium can be connected to the image forming apparatus 101.

The image forming apparatus 101 is a multi-function peripheral having a plurality of functions, such as a scanner function, a printer function, a facsimile function, and a file transmission function, integrated with a copying machine. The image forming apparatus 101 has an interface to which the portable storage medium is connected. Although there is no limitation in types of interface, a universal serial bus (USB) interface is used in the present exemplary embodiment. The image forming apparatus 101 can read and write data from and to the portable storage medium in such a manner that the portable storage medium is connected to the interface.

There is no limitation in types of portable storage medium as long as the portable storage medium is a storage device easily removable from a device serving as a host. According to the present exemplary embodiment, a USB storage 102 on which a USB mass storage class driver is mounted is used.

The client computer 103 is a so-called personal computer. The client computer 103 has an interface to which the portable storage medium is connectable. Although there is no limitation in types of interface, to which the portable storage medium is connected, a USB interface is used in the present exemplary embodiment. The client computer 103 can read and write data from and to the USB storage 102 in such a manner that the USB storage 102 is connected to the USB interface.

The external server 104 is a server that manages firmware and various types of license information that are usable in the image forming apparatus 101. The external server 104 may be directly connected to the LAN 100, or may be connected thereto via the Internet.

<<Example of Hardware Configuration-Image Forming Apparatus>>

Figure 2:
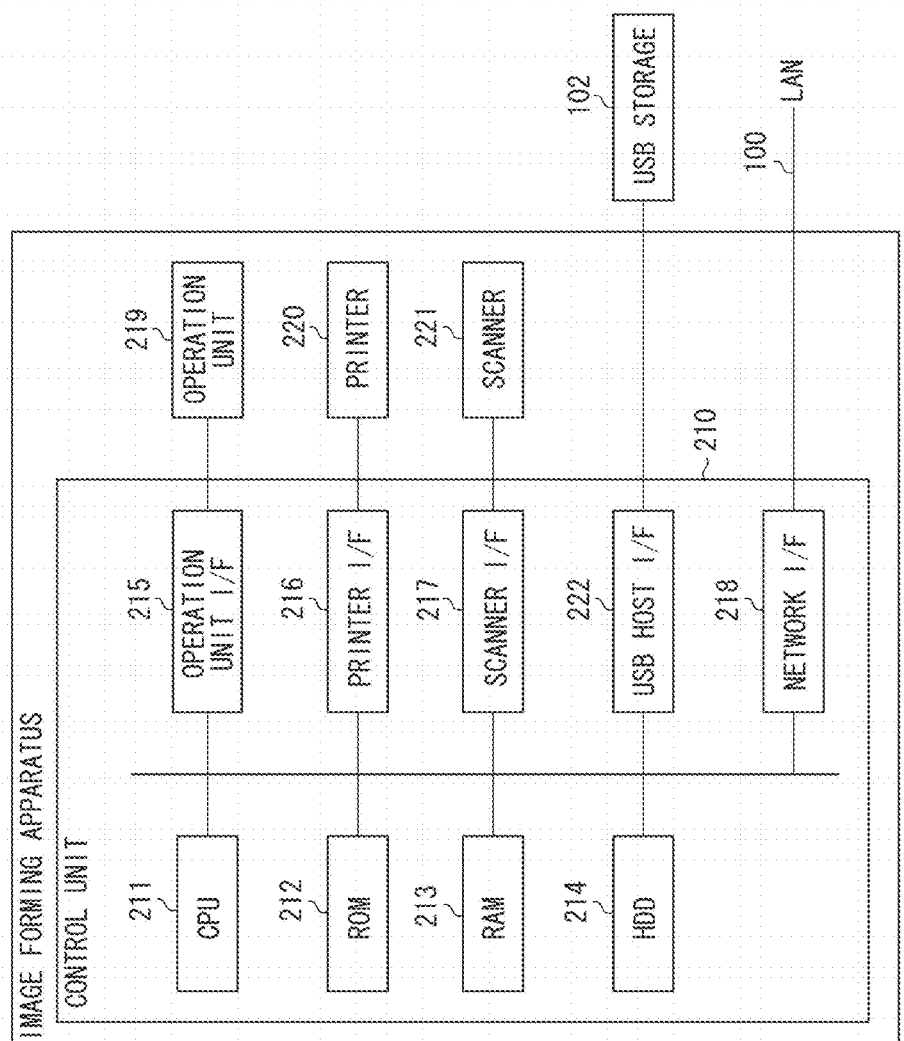
FIG. 2 is a block diagram illustrating a hardware configuration of an image forming apparatus.

FIG. 2 is a block diagram illustrating a hardware configuration of the image forming apparatus 101. A control unit 210 including a central processing unit (CPU) 211 controls an overall operation of the image forming apparatus 101. The CPU 211 reads out a control program stored in a read-only memory (ROM) 212, to perform various types of control, such as reading control and transmission control. A random access memory (RAM) 213 is used as a temporary storage area, such as a main memory or a work area of the CPU 211.

A hard disk drive (HDD) 214 stores image data, various types of programs, or various types of information tables. An operation unit interface (I/F) connects an operation unit 219 and the control unit 210 to each other. The operation unit 219 includes a liquid crystal display unit having a touch panel function and a keyboard.

A printer I/F 216 connects a printer 220 and the control unit 210 to each other. Image data to be printed by the printer 220 is transferred from the control unit 210 via the printer I/F 216, and is printed on a recording medium in the printer 220.

A scanner I/F 217 connects a scanner 221 and the control unit 210 to each other. The scanner 221 reads an image on a document to generate image data, and inputs the generated image data to the control unit 210 via the scanner I/F 217.

A network I/F 218 connects the control unit 210 (the image forming apparatus 101) to the LAN 100. The network I/F 218 transmits image data and information to an external apparatus on the LAN 100, and receives various types of information from the external apparatus on the LAN 100.

A USB host I/F 222 is an interface unit that communicates with the USB storage 102. The USB host I/F 222 outputs data stored in the HDD 214 to the USB storage 102. The USB host I/F 222 inputs data stored in the USB storage 102, and transmits the input data to the CPU 211. The USB storage 102 is an external storage device storing data, and is removably mounted on the USB host I/F 222. A plurality of USB devices including the USB storage 102 is connectable to the USB host I/F 222.

<<Example of Hardware Configuration-Client Computer>>

Figure 3:
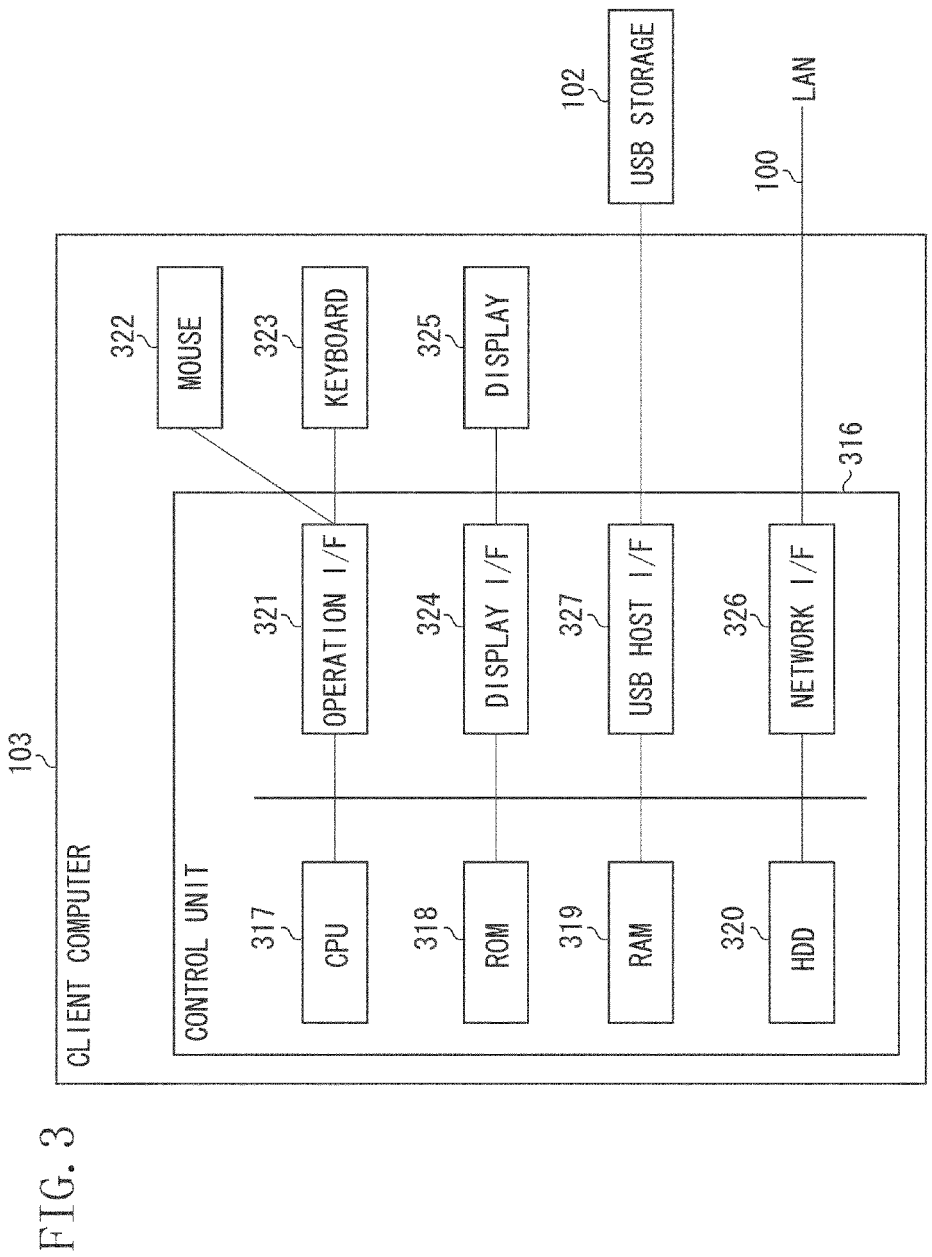
FIG. 3 is a block diagram illustrating a hardware configuration of a client computer.

FIG. 3 is a block diagram illustrating a hardware configuration of the client computer 103. A control unit 316 including a CPU 317 controls an overall operation of the client computer 103. The CPU 317 reads out a control program stored in a ROM 318, to perform various types of control processing. A RAM 319 is used as a temporary storage area, such as a main memory or a work area of the CPU 317. A HDD 320 stores image data, various types of programs, or various types of information tables, described below.

An operation I/F 321 is an I/F to which a user interface terminal for inputting a control operation to a program to be executed by the client computer 103 is connected. According to the present exemplary embodiment, the operation I/F 321 includes a mouse 322 and a keyboard 323. However, the present invention is not limited to this.

A display I/F 324 is an I/F to which a display terminal for displaying a user interface (UI) of a program to be executed by the client computer 103 is connected. According to the present exemplary embodiment, the display I/F 324 includes a display 325. However, the present invention is not limited to this.

A network I/F 326 connects the control unit 316 to the LAN 100. The network I/F 326 transmits and receives various types of information to and from other apparatuses via the network.

A USB host I/F 327 is an interface unit that communicates with the USB storage 102. The USB host I/F 327 outputs data stored in the HDD 320 to the USB storage 102. The USB host I/F 327 inputs data stored in the USB storage 102, and transmits the input data to the CPU 317. The USB storage 102 is an external storage device storing data, and is removably mounted on the USB host I/F 327. A plurality of USB devices including the USB storage 102 is connectable to the USB host I/F 327.

<<Example of Hardware Configuration-External Server>>

Figure 4:
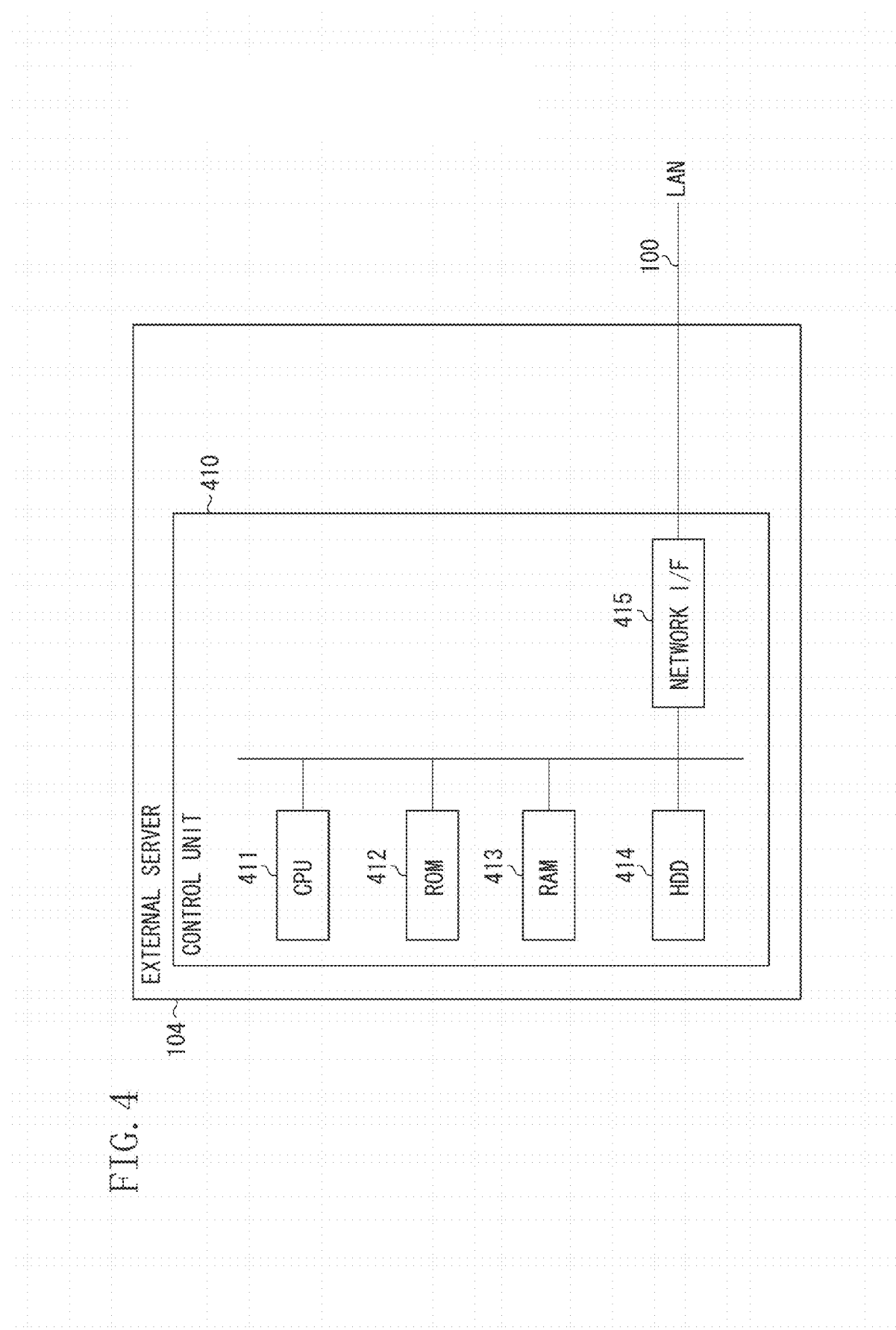
FIG. 4 is a block diagram illustrating a hardware configuration of an external server.

FIG. 4 is a block diagram illustrating a hardware configuration of the external server 104. A control unit 410 including a CPU 411 controls an overall operation of the external server 104. The CPU 411 reads out a control program stored in a ROM 412, to perform various types of control processing. A RAM 413 is used as a temporary storage area, such as a main memory or a work area of the CPU 411. A HDD 414 stores image data, various types of programs, or various types of information tables, described below.

A network I/F 415 connects the control unit 410 to the LAN 100. The network I/F 415 transmits and receives various types of information to and from other apparatuses via the network.

<<Example of Software Configuration-Image Forming Apparatus>>

Figure 5:
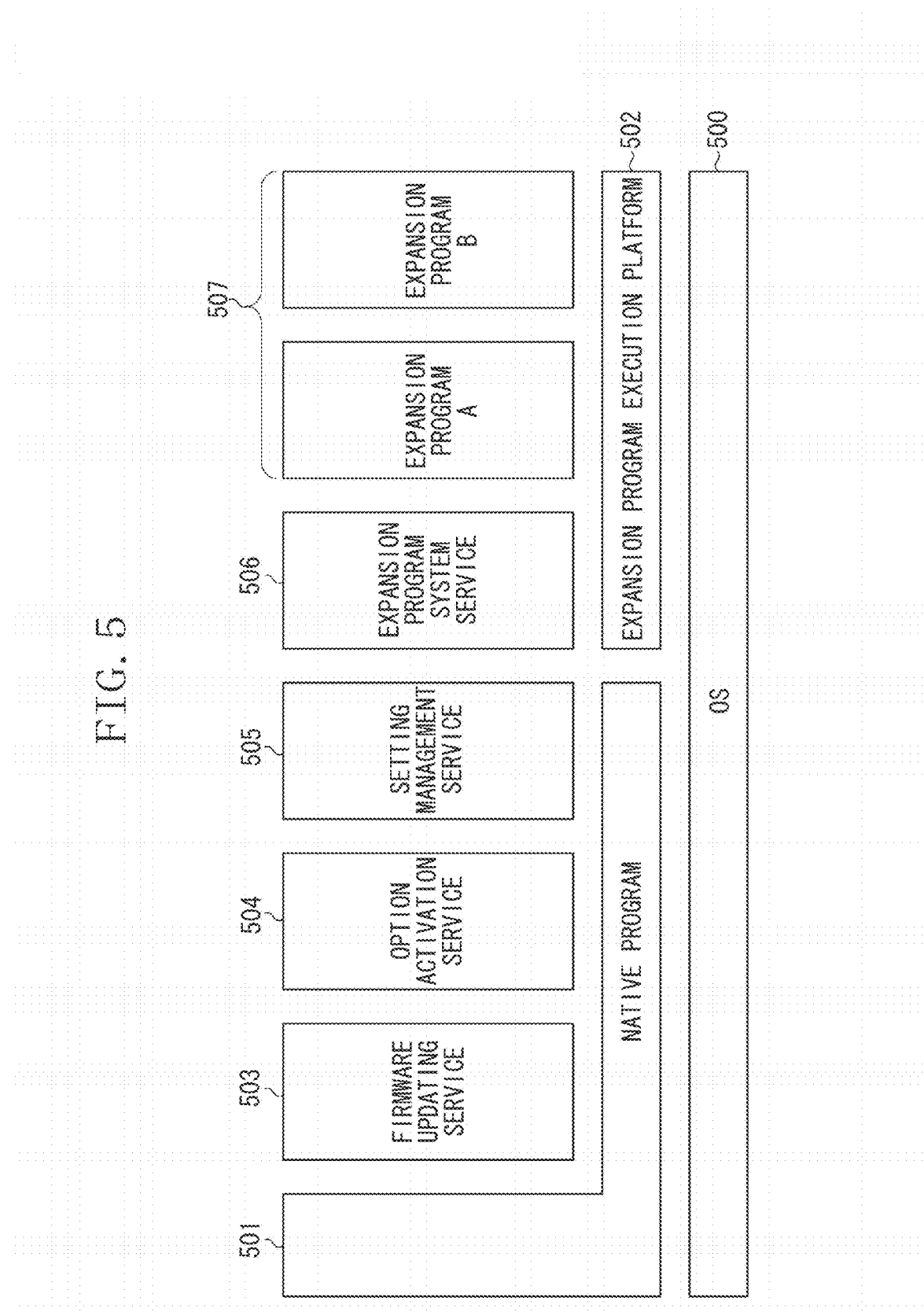
FIG. 5 is a block diagram illustrating a software configuration of the image forming apparatus.

FIG. 5 illustrates an example of a software configuration of the image forming apparatus 101.

A native program 501 as an original control program for a printer, a facsimile (FAX), or a scanner and an expansion program execution platform 502 as a platform for executing an expansion program run on an operating system (OS) 500. Further, a firmware updating service 503, an option activation service 504, and a setting management service 505 run on the native program 501. An expansion program system service 506 and expansion programs 507 run on the expansion program execution platform 502.

The firmware updating service 503 is a service for providing various types of functions for updating firmware. For example, the firmware updating service 503 refers to firmware designated by a user, to determine whether the firmware needs to be updated. The firmware is updated for or via the native program 501.

The option activation service 504 is a service for activating an option function previously incorporated into the native program 501. The option activation service 504 identifies and activates an option function specified by an option license file designated by the user.

The setting management service 505 is a service for managing various types of setting information of, for example, a printer and a scanner. The setting management service 505 provides a function for rewriting setting information about the native program 501 when the user designates one or a plurality of settings or a file including a plurality of setting information, for example. The setting management service 505 has a UI. The user can issue an instruction to change a setting via the operation unit 219 in the image forming apparatus 101. The expansion program system service 506 is a utility library commonly useful for the expansion programs 507, and is provided from the system. Time and labor to develop the expansion programs 507 can be saved by calling a function of the expansion program system service 506 from the expansion program 507. The expansion program 507 can access modules of the image forming apparatus 101, such as the other expansion program 507 or the RAM 213, only via the expansion program execution platform 502 or the expansion program system service 506. The expansion program 507 having a UI can display an icon on a main menu screen (FIG. 6) displayed on the operation unit 219 in the image forming apparatus 101. When the operation I/F 215 detects that the user has selected the icon via the operation unit 219, the operation unit I/F transmits the detection to the CPU 211. The CPU 211, which has received the detection, displays the UI of the expansion program 507 selected by the user on the operation unit 219.

The above software configuration is merely a basic portion. The software configuration may include another service depending on an implementation environment. An unnecessary service may be omitted for the reason that the setting is restricted, for example.

Figure 6:
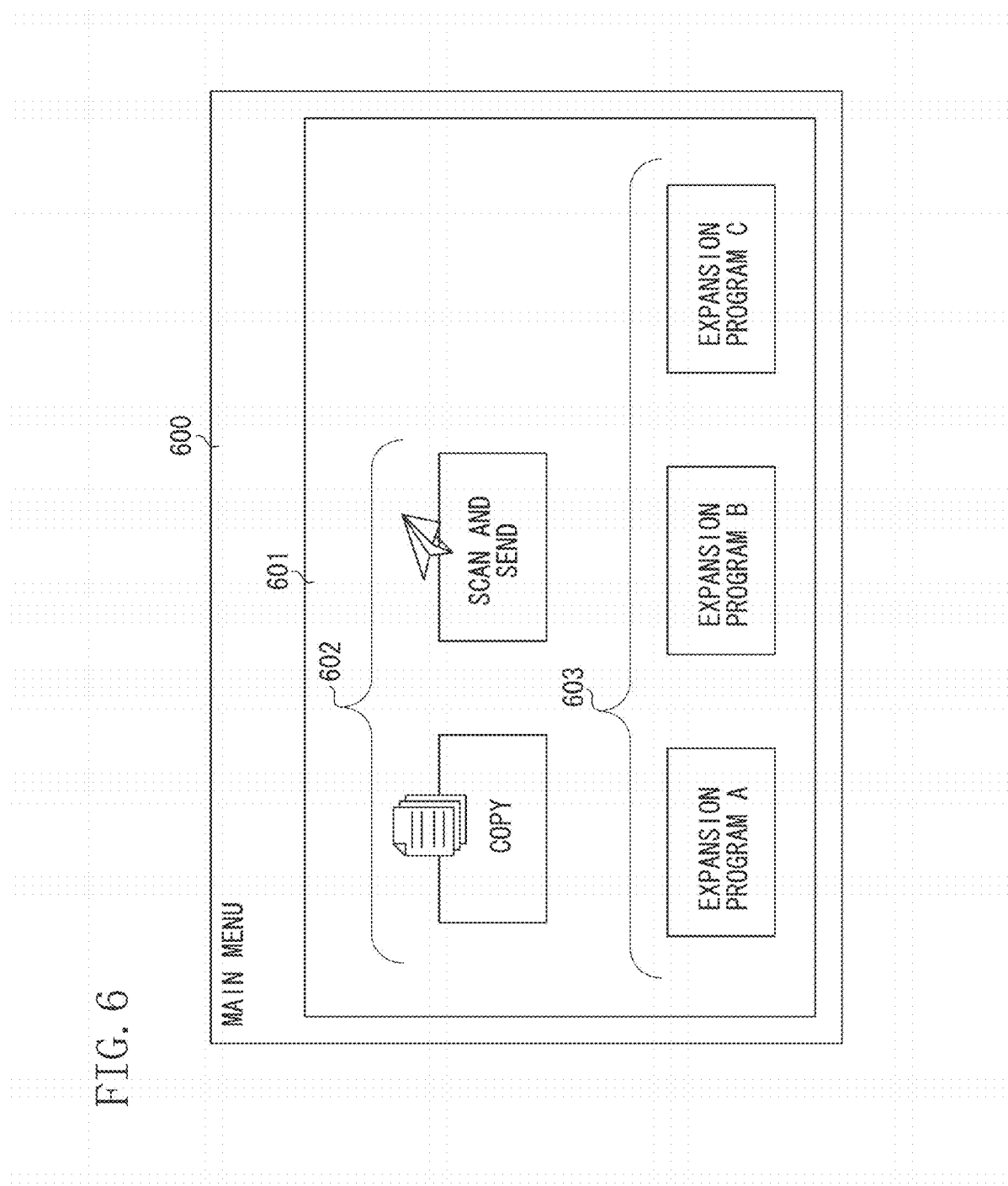
FIG. 6 illustrates a main menu screen of the image forming apparatus.

FIG. 6 is a diagram illustrating an example of a main menu screen displayed on the operation unit 219 in the image forming apparatus 101.

A main menu screen 600 includes a program icon display area 601, a standard program icon 602, and an expansion program icon 603.

The program icon display area 601 is an area where an icon of a program currently operable by the image forming apparatus 101 is displayed.

The standard program icon 602 is an icon for displaying a UI for operating a function of a control program for the image forming apparatus 101.

The expansion program icon 603 is an icon for displaying a UI for operating the expansion program 507 for the image forming apparatus 101.

<<Example of Installation Work>>

Initial installation work for the image forming apparatus 101 according to the present exemplary embodiment of the invention will be described below.

When performing the initial installation work for the image forming apparatus 101, an operator connects the USB storage 102 to the client computer 103.

The operator operates the management system operated by the client computer 103, and writes installation instruction information about the corresponding image forming apparatus 101 and an initial installation work setting value into the USB storage 102.

The operator installs a support program for supporting the initial installation work (hereinafter referred to as "support program") into the image forming apparatus 101 as a target of initial installation work. The support program may already been installed and executed in the image forming apparatus 101. The support program may be mounted and executed as a standard service on the native program 501.

The operator removes the USB storage 102 from the client computer 103, and connects the USB storage 102 to the image forming apparatus 101.

The support program in the image forming apparatus 101 detects the installation instruction information in the USB storage 102 and automatically executes initial installation work described in a script. In this process, the support program uses the initial installation work setting value and the installation instruction information to generate delay execution instruction information and automatically executes the initial installation work. The support program also accesses an external network to obtain required information, as needed. Then, the delay execution instruction information is set in the image forming apparatus 101 in order that the image forming apparatus 101 is adapted to a use environment of a client. Details will be described below with reference to FIG. 12.

<<Example of Software Functional Configuration>>

Storage instruction information output processing for the installation instruction information (described below) according to the present exemplary embodiment is performed by the support program as one of the expansion programs 507.

Installation instruction information output processing (described below) according to the present exemplary embodiment of the invention is performed by a program running on the client computer 103.

Figure 7:
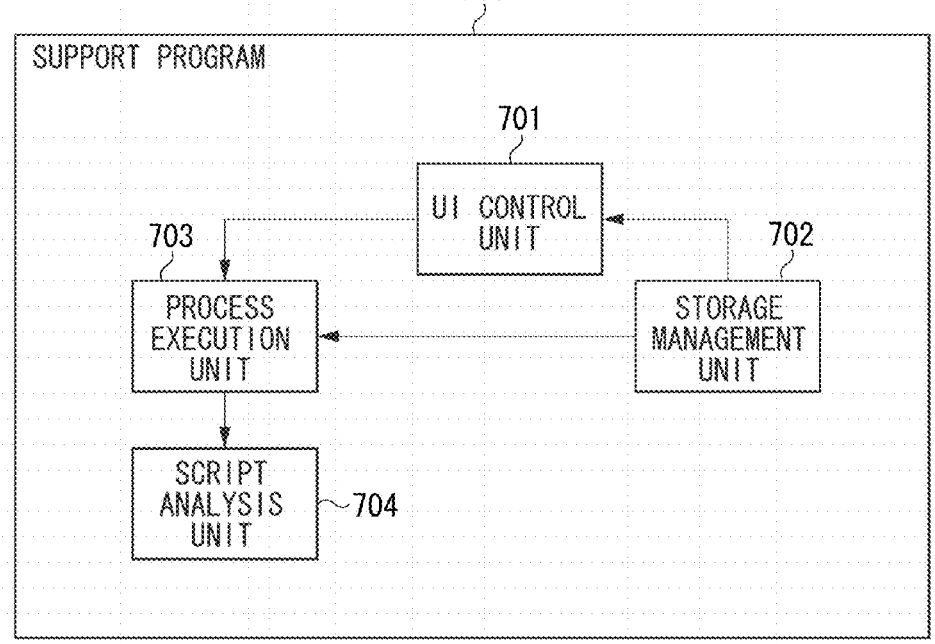
FIG. 7 is a block diagram illustrating a software functional configuration of a support program running on the image forming apparatus.

FIG. 7 illustrates an example of a functional configuration of a support program 700 running on the image forming apparatus 101. Each of functions is implemented in such a manner that the CPU 211 executes a program corresponding to the function.

The support program 700 includes a UI control unit 701, a storage management unit 702, a process execution unit 703, and a script analysis unit 704.

The UI control unit 701 provides a UI for operating the support program 700 to the operator via the operation unit 219, and receives an operation by the operator.

The storage management unit 702 reads or writes data from or to the USB storage 102. The storage management unit 702 detects insertion/removal of the USB storage 102.

The process execution unit 703 performs various types of processes according to respective instructions from the UI control unit 701 and the storage management unit 702.

The script analysis unit 704 analyzes a script in the installation work instruction information stored in the USB storage 102, and determines the processes to be executed by the process execution unit 703 and the order of the processes.

Figure 8:
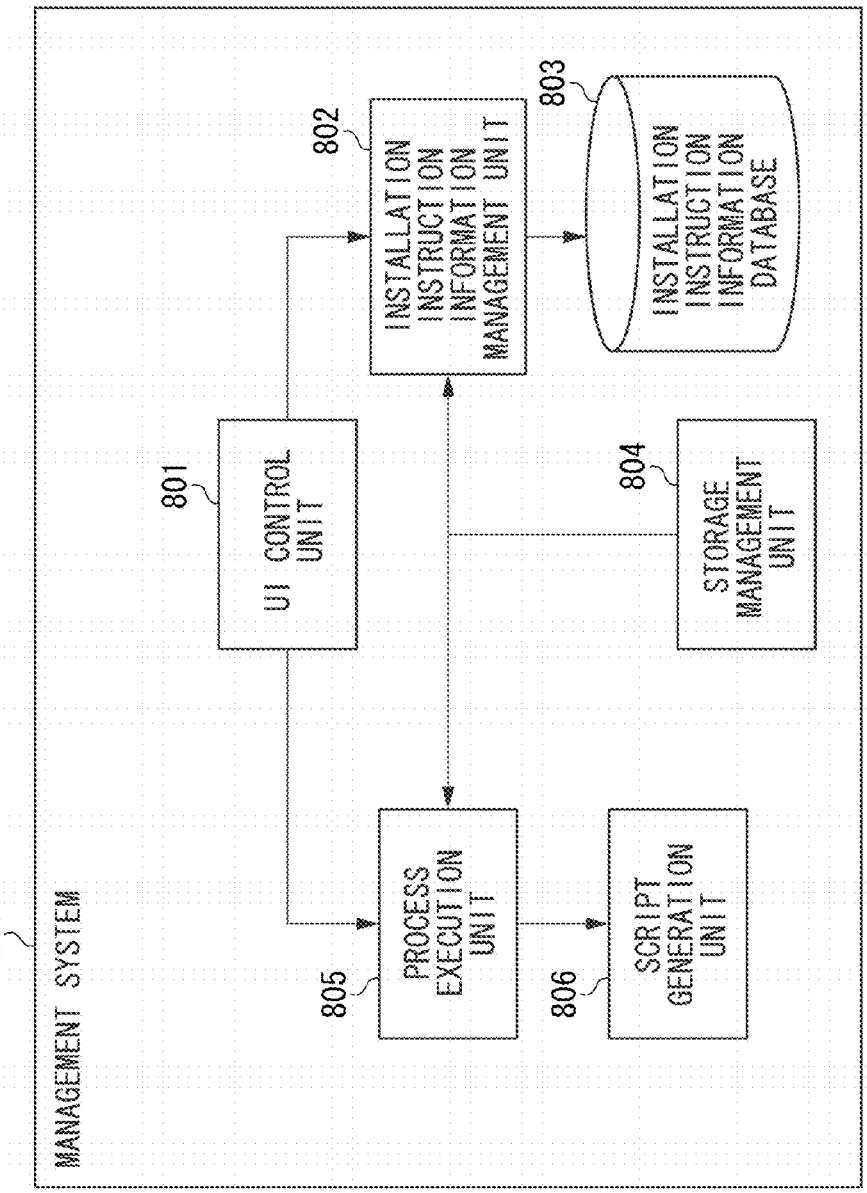
FIG. 8 is a block diagram illustrating a software functional configuration of a management system running on the client computer.

FIG. 8 is a diagram illustrating an example of a functional configuration of a management system 800 that operates on the client computer 103. Each of the functions is implemented in such a manner that the CPU 317 executes a program corresponding to the function. According to the present exemplary embodiment, the program is executed by the client computer 103. However, the present invention is not limited to this. The program may be executed by a server or a service on the network via the network I/F 326.

The management system 800 includes a UI control unit 801, an installation instruction information management unit 802, an installation instruction information database 803, a storage management unit 804, a process execution unit 805, and a script generation unit 806.

The UI control unit 801 provides a UI for operating the management system 800 to the operator via the display 325, and receives an operation by the operator via the mouse 322 or the keyboard 323.

The installation instruction information management unit 802 manages reading and writing of the installation instruction information according to respective instructions from the UI control unit 801 and the process execution unit 805, and stores the installation instruction information in the installation instruction information database 803. According to the present exemplary embodiment, a Structured Query Language (SQL) database is used for the installation instruction information database 803. However, the present invention is not limited to this. The installation instruction information may be stored in a file system using a method such as a structured file. According to the present exemplary embodiment, the installation instruction information is stored in the HDD 320 in the client computer 103. However, the present invention is not limited to this. The installation instruction information may be managed by a server or a service on the network via the network I/F 326.

The storage management unit 804 reads and writes data in the USB storage 102. The storage management unit 804 detects insertion/removal of the USB storage 102.

The process execution unit 805 performs various types of processes according to respective instructions from the UI control unit 801 and the storage management unit 804.

The script generation unit 806 generates a script, which can be analyzed by the installation instruction information and the support program 700 according to an instruction from the process execution unit 805.

<<Example of Installation Instruction Information and Script in USB Storage>>

Figure 9:
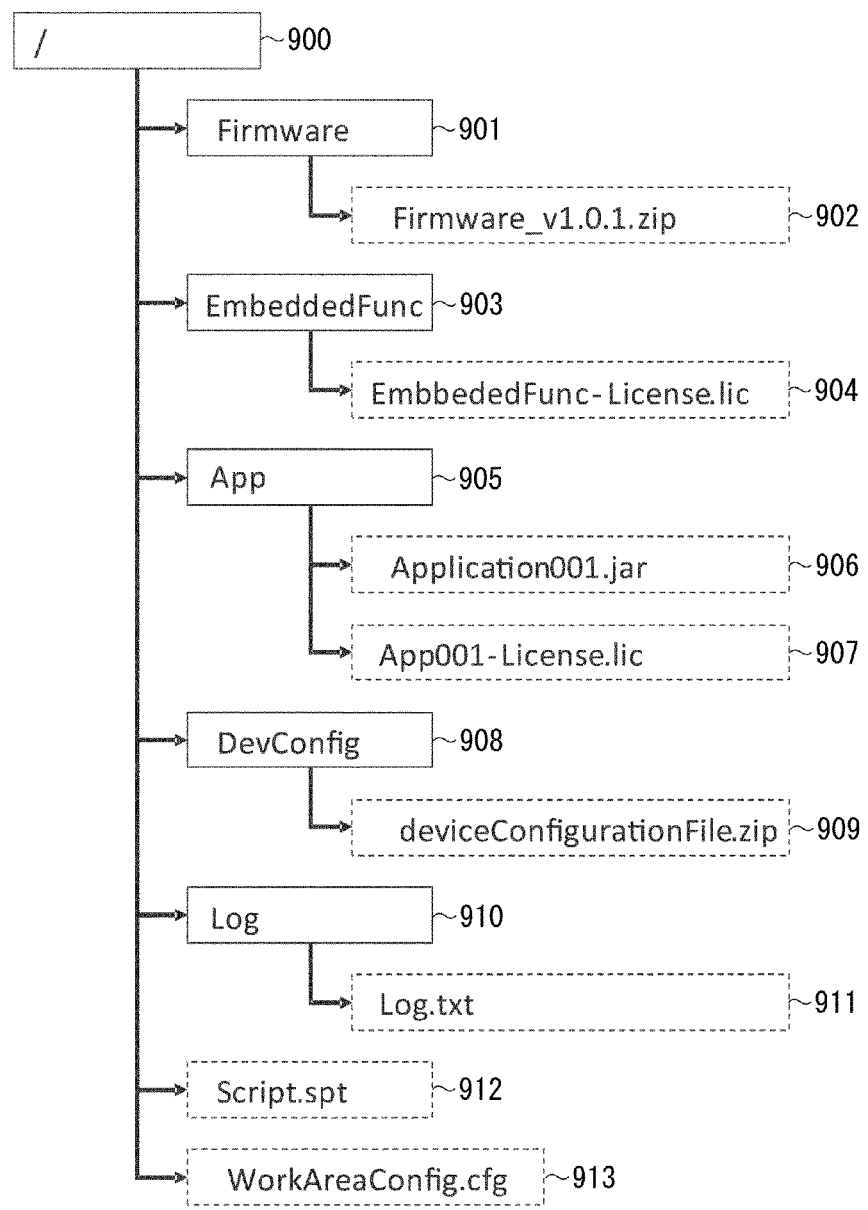
FIG. 9 is a diagram illustrating a configuration of a universal serial bus (USB) storage used by the support program.

FIG. 9 is a diagram illustrating an example of a configuration of folders and files in the USB storage 102 used by the support program 700 according to the present exemplary embodiment.

A root folder 900 includes a Firmware folder 901, an EmbeddedFunc folder 903, an App folder 905, a DevConfig folder 908, a Log folder 910, a Script.spt file 912, and a WorkAreaConfig.cfg 913.

The Firmware folder 901 is a folder storing firmware to be updated for the image forming apparatus 101. In the example illustrated in FIG. 9, the Firmware folder 901 includes a Firmware_v1.0.1.zip file 902 having a firmware group archived in a zip format.

The EmbeddedFunc folder 903 is a folder storing a license file for activating a function pre-installed in the image forming apparatus 101. In the example illustrated in FIG. 9, the EmbeddedFunc folder 903 includes a license file EmbeddedFunc-License.lic 904.

The App folder 905 is a folder storing an expansion program to be installed into the image forming apparatus 101 in initial installation work and a license file required for installation of the expansion program. In the example illustrated in FIG. 9, the App folder 905 includes an expansion program Application001.jar 906 and a license file App001-License.lic 907.

The DevConfig folder 908 is a folder storing setting information previously set and exported in a reference image forming apparatus.

In the example illustrated in FIG. 9, the DevConfig folder 908 includes a file deviceConfigurationFile.zip 909 archived in a zip format.

The Log folder 910 is a folder for storing a file of an execution result by the support program 700 (hereinafter referred to as "log"). In the example illustrated in FIG. 9, the Log folder 910 stores a file Log.txt 911. However, the Log folder 910 and the file Log.txt 911 do not exist before the support program 700 is executed. The folders and the files are generated in such a manner that the support program 700 once generates the Log folder 910 and the file Log.txt 911 and copies them during or after the execution.

The Script.spt file 912 is an instruction sheet (script) indicating a work procedure for automatically processing initial installation work. Details of the script will be described below in FIG. 10. According to the present exemplary embodiment, the script is a file for defining the procedure for the initial installation work. However, it may be determined whether the support program 700 can be executed depending on the presence or absence of the script file 912. More specifically, the script may be used as an identifier indicating that the USB storage 102, which is being used, is the USB storage 102 for the support program 700 according to the present exemplary embodiment.

The WorkAreaConfig.cfg 913 is an initial installation work setting value to be applied to the image forming apparatus 101 that is used while the initial installation work is performed. Details of the initial installation work setting value will be described below with reference to FIG. 11.

The configuration illustrated in FIG. 9 is merely an example. The present invention is not limited to this. Any arbitrary folder configuration may be used.

FIG. 10 is a diagram illustrating an example of a script 1000 in installation instruction information indicating a work procedure for automatically implementing initial installation work for the image forming apparatus 101.

The script 1000 is read by the storage management unit 702 in the support program 700, and is analyzed by the script analysis unit 704 via the process execution unit 703. After the script 1000 is analyzed by the script analysis unit 704, the initial installation work described by the process execution unit 703 is then performed. The script 1000 illustrated in FIG. 10 is described in an Extensible Markup Language (XML), and includes a device identification portion 1001 and a process description portion 1002. According the present exemplary embodiment, the script 1000 is expressed in the XML in FIG. 10. However, the script language is not limited to the XML. Alternatively, for example, a shell script may be used.

<Device Identification Portion 1001>

The device identification portion 1001 contains information for identifying the image forming apparatus 101, as a target of the initial installation work, and includes <deviceId> as an identifier of the image forming apparatus 101 and <comment> indicating a content of the script 1000 in any arbitrary character string. The <comment> may be used as not only a description of a content of the script 1000 but also as an identifier in a case where the image forming apparatus 101 cannot be identified by only <deviceId>. For example, <comment> is usable as an identifier in a case where a plurality of settings need to be prepared for the single image forming apparatus 101.

<Process Description Portion 1002>

The process description portion 1002 contains a processing group required for implementation of the initial installation work. In FIG. 10, the process description portion 1002 includes a firmware updating process 1003*a* (or 1003*b*), an expansion program installation process 1004*a* (or 1004*b*), an expansion program start process 1005, a system built-in option program activation process 1006*a* (or 1006*b*), and a setting information import process 1007. A tag indicating each of the processes for the initial installation work includes an Order attribute. In FIG. 10, the order of the processes for the initial installation work is determined depending on respective values of the Order attributes. In a case where the order of the processes is not particularly designated, the values of the Order attributes can also be set equal. In a case where the values of the Order attributes are set equal, the processes may be executed in the order written in the process description portion 1002, or may be executed in the order read by the script analysis unit 704. The order of the processes may be determined depending on the capacity of data used in each of the processes.

<Firmware Updating Process 1003>

The firmware updating processes 1003*a* and 1003*b* are processes for updating firmware via the firmware updating service 503. The firmware updating process 1003*a* defines the process by describing an <updateFirmwareCommand> tag, and designates a file to be used using a <relativeDirPath> tag and a <FirmwareName> tag. In the <relativeDirPath> tag, a relative path from the root folder 900 to firmware to be updated is described. In the <FirmwareName> tag, the firmware to be updated is designated. In FIG. 10, firmware, which has been archived in a Zip format, is designated. The firmware updating process 1003*b* defines the process by describing the <updateFirmwareCommand> tag, and designates firmware to be downloaded and updated from the external server 104 using a <contentsServer> tag and a <firmwareVersion> tag. In the <contentsServer> tag, a URL of the external server 104 is described. In the <firmwareVersion> tag, a firmware version as a key for downloading is described.

<Expansion Program Installation Process 1004>

The expansion program installation process 1004*a* and 1004*b* are processes for installing an expansion program via the expansion program system service 506.

The expansion program installation process 1004*a* defines the process by describing an <installApplicationCommand> tag, and designates an expansion program to be installed using a <relativeDirPath> tag and an <AppFileName> tag. In the <relativeDirPath> tag, a relative path from the root folder 900 to an entity of the expansion program to be installed is described. In the <AppFileName> tag, an entity of the expansion program to be installed is designated. In FIG. 10, an expansion program in a Jar file format is designated. The format of the expansion program is not limited to the Jar file format.

The expansion program installation process 1004*b* defines the process by describing an <installApplicationCommand> tag, and designates an expansion program to be downloaded and installed from the external server 104 using a <contentsServer> tag, an <applicationName> tag, and an <applicationVersion> tag. In the <contentsServer> tag, a URL of the external server 104 is described.

The expansion program installation process 1004*a* designates a license for the expansion program to be installed using a <licenseRelativeDirPath> tag and a <licenseFileName> tag. In the <licenseRelativeDirPath> tag, a relative path from the root folder 900 to the license for the expansion program is described. In the <licenseFileName> tag, an entity of the license for the expansion program is designated. In FIG. 10, a license in a lic file format is designated. A file format of the license is not limited to this.

The expansion program installation process 1004*b* contains a <licenseServer> tag in which a URL of the external server 104 from which the license for the expansion program is acquired is described.

<Expansion Program Start Process 1005>

The expansion program start process 1005 defines the process by describing a <startApplicationCommand> tag, and designates an expansion program to be started using an <appId> tag. In the <appId> tag, an ID for uniquely identifying the expansion program to be started is designated.

<System Built-in Option Program Activation Process 1006>

The system built-in option program activation processes 1006*a* and 1006*b* are processes for activating a built-in option program via the option activation service 504.

The system built-in option program activation process 1006*a* defines the process by describing an <activateEmbeddedFunctionCommand> tag, and designates a built-in option program to be activated using a <relativeDirPath> tag and a <licenseFileName> tag. In the <relativeDirPath> tag, a relative path from the root folder 900 to a license file of the built-in option program to be activated is described. In the <licenseFileName> tag, an entity of the license for activating the built-in option program is designated. In FIG. 10, a license file in a lic file format is designated. A file format of the license file is not limited to this. In a case where the built-in option program pre-installed into the image forming apparatus 101 does not exist or is not activated, the process for the initial installation work need not be described.

The system built-in option program activation process 1006b defines the process by describing an <activateEmbeddedFunctionCommand> tag. In the <licenseServer> tag, a URL of the external server 104 from which the license for the expansion program is acquired is described. Information for specifying the built-in option program to be acquired is described using a <functionId> tag.

<Setting Information Import Process 1007>

The setting information import process 1007 defines the process by describing an <importDeviceConfigCommand> tag, and designates a setting information file to be imported using a <relativeDirPath> tag and a <configFileName> tag. In the <relativeDirPath> tag, a relative path from the root folder 900 to a setting information file to be imported is described. In the <configFileName> tag, the setting information file to be imported is designated. In FIG. 10, a setting information file, which has been archived in a Zip file format, is designated. A format of the setting information file is not limited to a Zip file format.

The processes for the initial installation work described in the script illustrated in FIG. 10 are not limited to the described processes. A process for restarting the image forming apparatus 101, for example, may be added. The processes may duplicate each other, or the number of the processes may be increased or decreased, as needed.

<<Initial Installation Work Setting Value>>

FIG. 11 is a diagram illustrating an example of a setting value file to be used while initial installation work for the image forming apparatus 101 is implemented.

An initial installation work setting value 1100 is read by the storage management unit 702 of the support program 700, and is set to each function of the image forming apparatus 101 by the process execution unit 703. According to the present exemplary embodiment, the initial installation work setting value 1100 illustrated in FIG. 11 is described in an XML. However, the written language is not limited to the XML. Alternatively, a text file may be used.

A network setting value 1101 contains an IP address and a subnet mask. A network setting for a client included in installation instruction information differs from a network setting of an initial installation work location. Therefore, if the network setting value 1101 is applied to the image forming apparatus 101, the image forming apparatus 101 cannot connect to the network at the initial installation work location to execute the above described script 1000. The network setting value 1101 contains a network setting for the initial installation work location connectable to the external server 104. A proxy server may be required in order that the external server 104 exists in the Internet.

A USB storage setting value 1102 contains a use setting of the USB storage 102. A USB storage setting for the client included in the installation instruction information may be a setting value inhibiting the USB storage 102 from being used. To reduce a risk of bringing out data in a client environment, the USB storage 102 is inhibited from being used for the purpose of inhibiting data from being used. However, if the USB storage setting value 1102 is applied to the image forming apparatus 101, the image forming apparatus 101 cannot connect to the USB storage 102 at the initial installation work location to execute the above described script 1000.

A power supply management timer setting value 1103 contains a setting of a time period elapsed until the image forming apparatus 101 shifts to sleep. If the image forming apparatus 101 shifts to sleep during the initial installation work, the operator needs to wait for the image forming apparatus 101 to return from the sleep state at each time when resuming an operation. It results in reduced work efficiency. To avoid this, a sleep shift time period is settable.

A device management setting value 1104 contains authentication information for operating the image forming apparatus 101. As administrator information about an image forming apparatus during an operation of a client, authentication information known by only a person, who is to manage a business machine, such as an information technology (IT) administrator staff is set. However, when the operator is to operate the image forming apparatus at the initial installation work location, it takes time and labor for the operator to input the administrator information of the client. The operator needs to initially install image forming apparatuses of a plurality of clients. Therefore, it is also difficult for the operator to store administrator information of the clients, and it results in reduced work efficiency. To avoid this, authentication information dedicated to the initial installation work is temporarily settable.

Setting values described in the initial installation work setting value 1100 are not limited to the above described values. In implementing the initial installation work at the initial installation work location, a setting value dependent on an environment and a setting value causing reduced efficiency of the operator may be able to be described in the initial installation work setting value 1100.

<<Processing Flow of Installation Instruction Information>>

Figure 12:
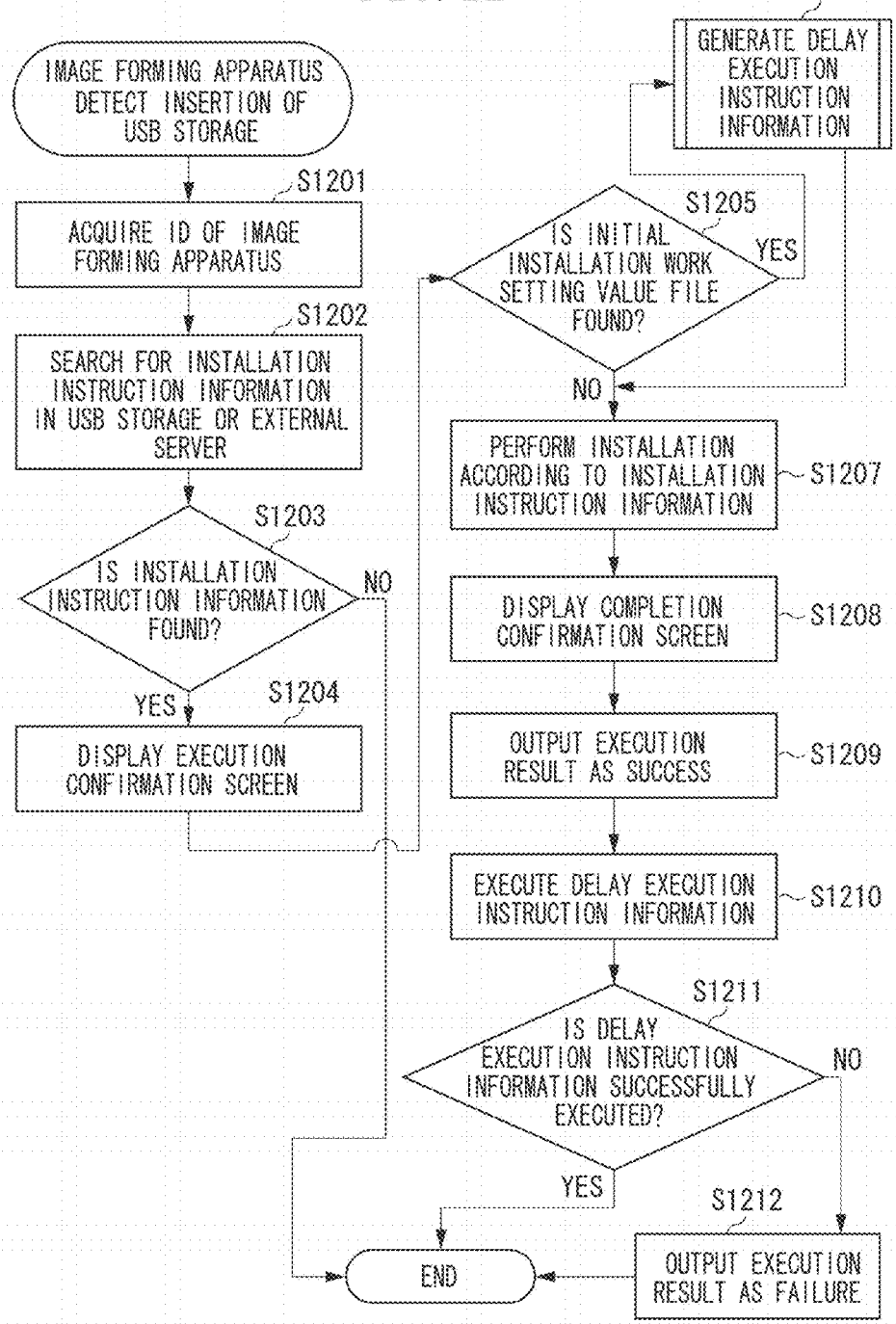
FIG. 12 is a flowchart illustrating processing for executing installation instruction information.

FIG. 12 is a flowchart illustrating an operation to be performed after the support program 700 is started according to the present exemplary embodiment of the invention.

In step S1201, the process execution unit 703 acquires an ID assigned to the image forming apparatus 101 in which the support program 700 runs. The ID is information for specifying the image forming apparatus 101 to be installed, such as an individual identifier or a model number of the image forming apparatus 101. In step S1202, the storage management unit 702 searches for a script file of installation instruction information stored in the USB storage 102 or the external server 104, and specifies the installation instruction information to be executed in the image forming apparatus 101. The search is performed based on an extension of the script. Further, the search is performed depending on whether the ID, which has been acquired in step S1201, is described in the script. FIG. 10 illustrates an example of the script file included in the installation instruction information. In the script file, the device identification portion 1001 contains the ID assigned to the image forming apparatus 101 to which the script 1000 is to be applied.

In step S1203, the process execution unit 703 determines whether the instillation instruction information to be executed, which has been specified in step S1202, has been found. If the installation instruction information has been found (YES in step S1203), the processing proceeds to step S1204. If the installation instruction information has not been found (NO in step S1203), the processing ends.

Figure 13:
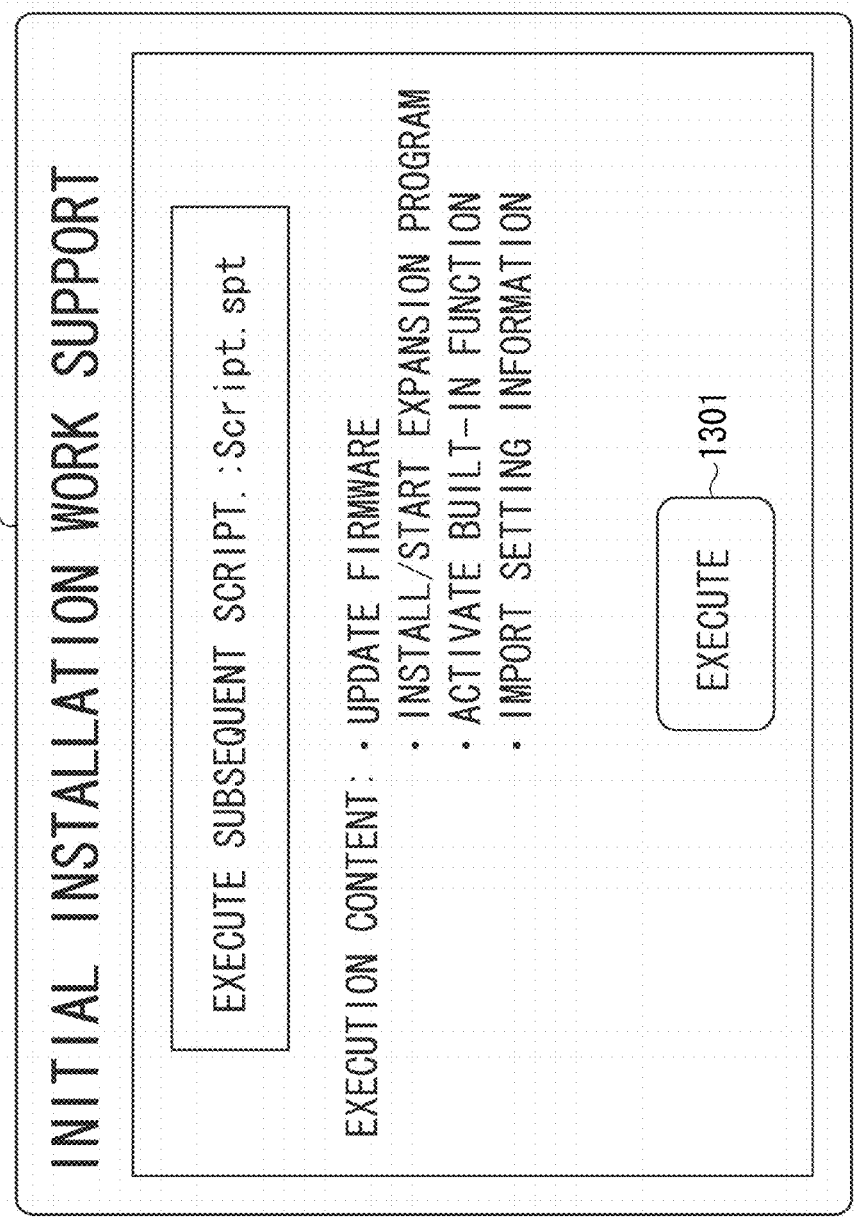
FIG. 13 is a diagram illustrating an execution confirmation screen of a script by the support program.

In step S1204, the UI control unit 701 displays the script file and the installation instruction information, which have been found in step S1202, on a screen illustrated in FIG. 13 in the operation unit 219, and notifies the operator of the script and the installation instruction information. The operator confirms that the correct installation instruction information has been found, and presses an execution button 1301, and the processing proceeds to the subsequent step S1205.

In step S1205, the UI control unit 701 displays a screen illustrated in FIG. 14 (FIG. 14 is a diagram illustrating a case where the USB storage 102 is used) in response to the installation instruction information, which has been found in step S1204. Further, the storage management unit 702 searches for an initial instruction work setting value file stored in the USB storage 102 or the external server 104, and determines whether the initial instruction work setting value file has been found. The search is performed based on an extension of the initial installation work setting value file. FIG. 11 illustrates an example of the initial installation work setting value 1100. The initial installation work setting value 1100 needs to be applied to the image forming apparatus 101 before the installation instruction information is executed. In a case where the initial installation work setting value file to be applied has been found (YES in step S1205), the processing proceeds to step S1206. In a case where the initial installation work setting value file has not been found (NO in step S1205), the processing proceeds to step S1207.

In step S1206, the script analysis unit 704 compares the initial installation work setting value 1100 and a client request setting value 1500, and generates delay execution instruction information 1600 in order to save a setting value, which affects initial installation work in the client request setting value 1500 to the delay execution instruction information 1600. After the saving, the client request setting value 1500 including the initial installation work setting value 1100 used for the initial installation work is generated. Processing for generating the delay execution instruction information 1600 will be described below with reference to FIG. 19.

In step S1207, the process execution unit 703 executes various types of commands according to the description in the process description portion 1002 in the script of the script file, which has been found in step S1203. The commands enable execution of installation, updating, and setting for software, which need to be executed as the initial installation work. The initial installation work includes updating of firmware including the native program 501 in the image forming apparatus 101 and installation and start of the expansion program 507, for example. In the setting information import process 1007, the client request setting value 1500 including the initial installation work setting value, which has been generated in step S1206, is set on the image forming apparatus 101. Thus, a network setting at an initial installation work location required for each process can be used, an unnecessary sleep setting can be canceled during the initial installation work, and authentication information dedicated to the initial installation work can be used.

Figure 18:
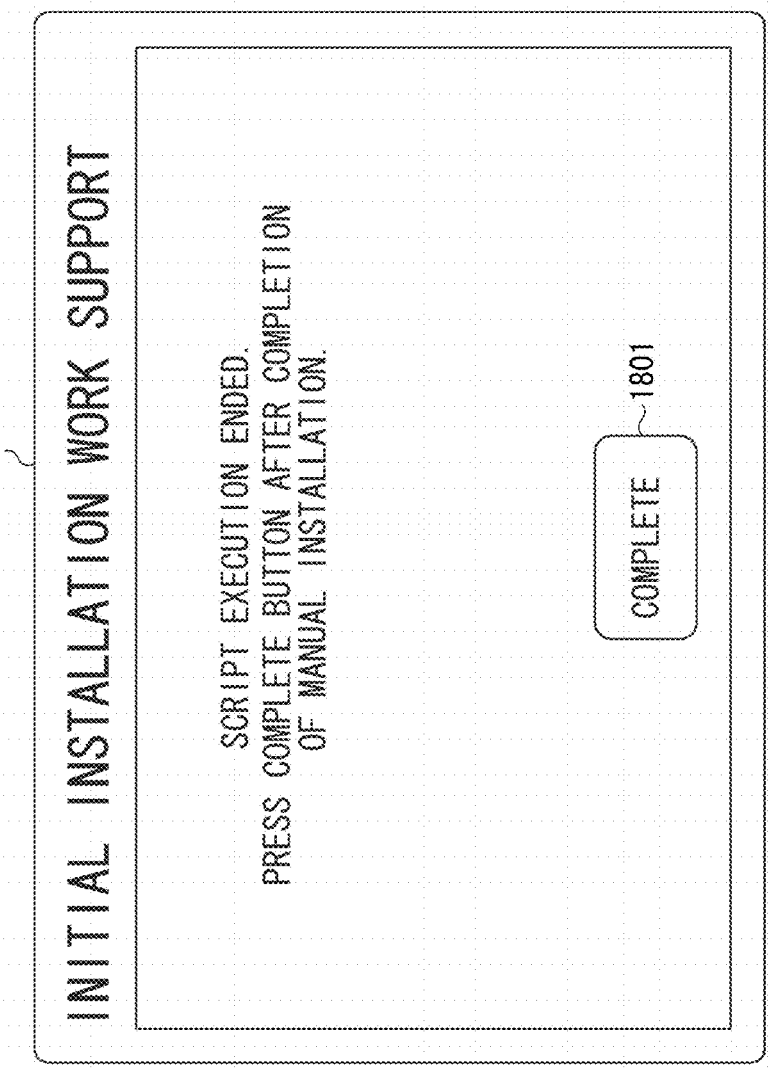
FIG. 18 is a diagram illustrating a completion confirmation screen by a support program.

In step S1208, the UI control unit 701 displays a screen indicating that automatic installation using the script ended, as illustrated in FIG. 18, and waits until initial installation work to be manually performed is completed. When the operator presses a completion button 1801 after the manual initial installation work and confirmation work end, the processing proceeds to step S1209.

In step S1209, the storage management unit 702 stores respective execution results of the various types of commands for the initial installation work, which have been executed in step S1207, in the USB storage 102 or the external server 104. In this process, the storage management unit 702 outputs an execution result as a success, although the delay execution instruction information 1600 has not been executed. Thus, the success can be left as a result of the entire initial installation work even if the USB storage 102 is inhibited from being used in step S1210 described below.

In step S1210, the process execution unit 703 sets the setting value that has been saved from the client request setting value 1500 to the delay execution instruction information 1600 generated in step S1206, on the image forming apparatus 101.

In step S1211, the process execution unit 703 determines whether the delay execution instruction information 1600 has been successfully executed. In a case where the delay execution instruction information 1600 has been unsuccessfully executed (NO in step S1211), the processing proceeds to step S1212. In a case where the delay execution instruction information 1600 has been successfully executed (YES in step S1211), the processing ends.

In step S1212, the process execution unit 703 outputs an execution result as a failure because the delay execution instruction information 1600 has been unsuccessfully executed in step S1210. A setting for inhibiting the USB storage 102 from being used, which is described in the USB storage setting value 1102 to be set in step S1210, has been unsuccessfully set. Therefore, the execution result, which has been output in step S1209, is overwritten as a failure. Thus, a failure can be left as a result of the entire initial instruction work.

<<Processing Flow for Generation of Delay Execution Instruction Information>>

FIGS. 19A and 19B are flowcharts illustrating processing for generating the delay execution instruction information 1600 by the script analysis unit 704 in step S1206 illustrated in FIG. 12.

In step S1901, the script analysis unit 704 determines whether processing in the following flow has been executed for the first setting value to the last setting value of the initial installation work setting value 1100: assuming that a setting value of the initial installation work setting value 1100 to be subsequently processed is an n-th setting value, determination of whether n is more than the number of setting values (n>the number of setting values) is performed. In a case where the processing has been performed for all the setting values of the initial installation work setting value 1100 (n> the number of setting values) (YES in step S1901), the processing ends. In a case where a setting value that has not yet been processed exists among the initial installation work setting value 1100 (n the number of setting values) (NO in step S1901), the processing proceeds to step S1902.

In step S1902, the script analysis unit 704 determines whether an n-th setting value of the initial installation work setting value 1100 is a setting value to be set in the client request setting value 1500 based on an attribute of "usage" included in the n-th setting value of the initial installation work setting value 1100.

In a case where the attribute of the n-th setting value is "force", the script analysis unit 704 determines that the setting value is a setting value to be always set without consideration for an initial installation work environment, and thus the processing proceeds to step S1903.

In a case where the attribute of the n-th setting value is "auto", the script analysis unit 704 determines that the setting value is a setting value to be set with consideration for the initial installation work environment, and thus the processing proceeds to step S1905.

The attribute "force" is included in a case where a setting value of the client request setting value 1500 is the setting value be always saved to the delay execution instruction information 1600 and a setting value of the initial installation work setting value 1100 is forcibly used. The attribute "auto" is included in a case where a setting value of the initial installation work setting value 1100 is the setting value to be automatically used in step S1905 and the subsequent steps (described below) with consideration for the initial installation work environment.

In step S1903, the script analysis unit 704 compares the client request setting value 1500 included in the deviceConfigurationFile.zip 909 described in the script 1000 included in the installation instruction information and the initial installation work setting value 1100 with each other, and sets a comparison result in the delay execution instruction information 1600. More specifically, the script analysis unit 704 sets the setting value corresponding to a setting item, which is described in the initial instillation work setting value 1100 and its attribute of "usage" is set to "force", among the setting values in the client request setting value 1500 in the delay execution instruction information 1600. The script analysis unit 704 adds an initial value of the setting value corresponding to a setting item, which is described in the initial installation work setting value 1100 and is not described in the client request setting value 1500, to the delay execution instruction information 1600.

FIG. 15 is a diagram illustrating an example of the client request setting value 1500 included in the deviceConfigurationFile.zip 909. The client request setting value 1500 includes setting values of various types of image forming apparatuses 101 requested by the client at delivery destination. A network setting value 1501 includes information, such as an address, that matches a network environment of the client. A USB storage setting value 1502 includes a setting value indicating whether reading and writing from and to the USB storage 102 are permitted. A power supply management timer setting value 1503, installation location information 1504, and a screen display setting 1505 respectively include desired setting values in accordance with a business machine operation policy of the client. A device management setting value 1506 includes authentication information used by an administrator of the image forming apparatus 101 of the client.

In step S1904, the script analysis unit 704 sets the setting value described in the initial installation work setting value 1100 in the client request setting value 1500 included in the deviceConfigurationFile.zip 909. Then, to process the subsequent setting value of the initial installation work setting value 1100, the script analysis unit 704 increments the setting value of the initial installation work setting value 1100 by one, and the processing proceeds to step S1901.

In step S1905, the script analysis unit 704 determines an acquisition location of the script file. If the script file is read from the USB storage 102, the processing proceeds to step S1906. If the script file is read from the network, the processing proceeds to step S1909.

In step S1906, the script analysis unit 704 sets the USB storage setting value 1502 described in the client request setting value 1500 in the delay execution instruction information 1600. The script analysis unit 704 adds the setting value corresponding to a setting item, which is described in the initial installation work setting value 1100 and is not described in the client request setting value 1500, to the delay execution instruction information 1600.

In step S1907, the script analysis unit 704 sets the USB storage setting value 1102 described in the initial installation work setting value 1100 in the client request setting value 1500 included in the deviceConfigurationFile.zip 909.

In step S1908, the script analysis unit 704 confirms whether a setting of an acquisition location of a license file to be used when each of the commands in the script 1000 is executed is a setting for acquiring the license file from the network. In a case where the network is not required (i.e., the USB storage 102), the script analysis unit 704 increments the setting value of the initial installation work setting value 1100 by one to process the subsequent setting value in the initial installation work setting value 1100, and the processing proceeds to step S1901. In a case where the network is required, the processing proceeds to step S1909.

With the above processing, the USB storage is not inhibited from being used during the processes for the initial installation work so that the initial installation work can be normally implemented up to the end.

In step S1909, the script analysis unit 704 sets the network setting value 1501 described in the client request setting value 1500 in the delay execution instruction information 1600. The script analysis unit 704 adds an initial value of the setting value corresponding to a setting item, which is described in the initial installation work setting value 1100 and is not described in the client request setting value 1500, to the delay execution instruction information 1600.

In step S1910, the script analysis unit 704 sets the network setting value 1101 described in the initial installation work setting value 1100 in the client request setting value 1500 included in the deviceConfigurationFile.zip 909. Then, the script analysis unit 704 increments the setting value in the initial installation work setting value 1100 by one to process the subsequent setting value in the initial installation work setting value 1100, and the processing proceeds to step S1901.

<<Delay Execution Instruction Information and Client Request Setting Value>>

Figure 17:
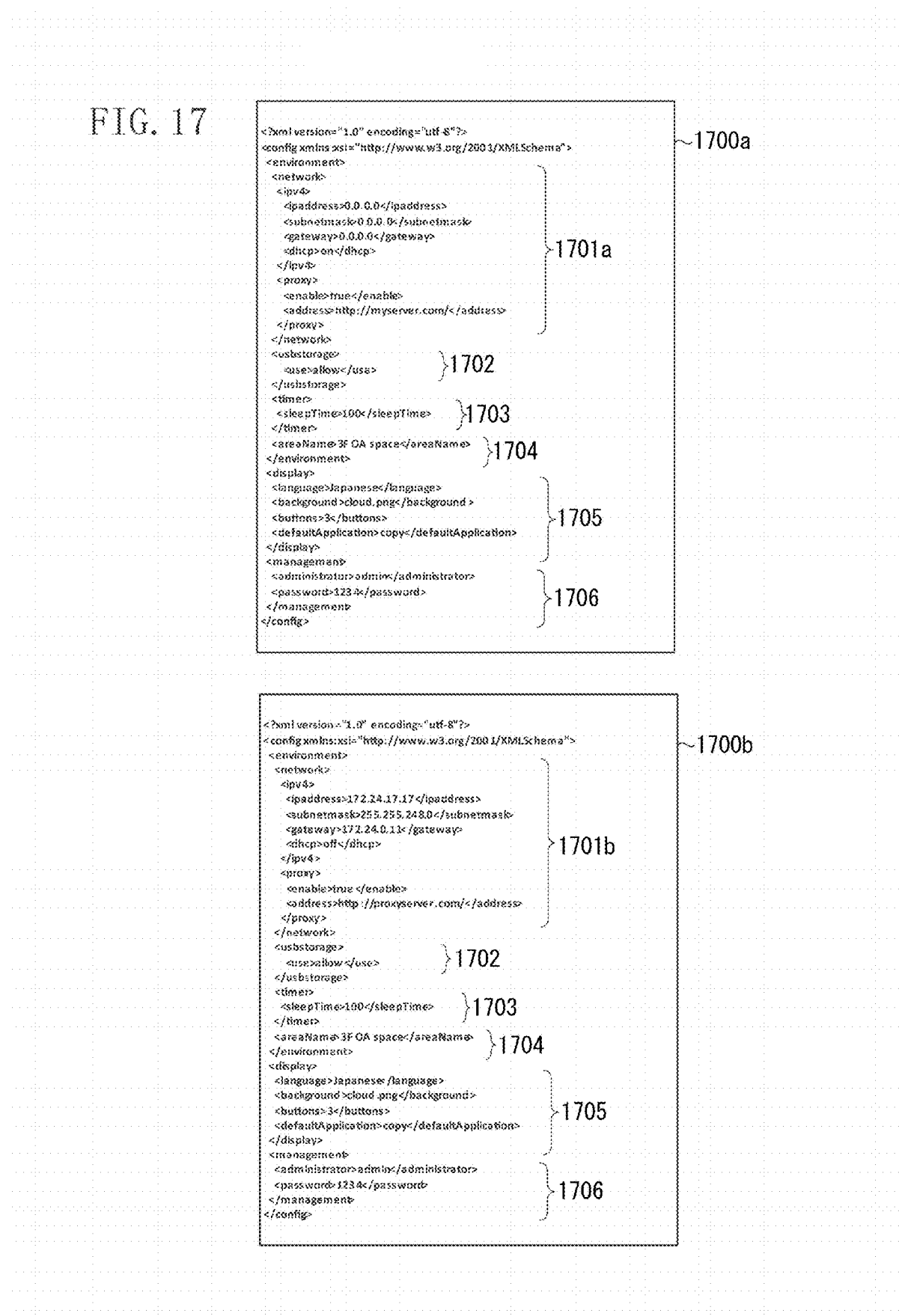
FIG. 17 is a diagram illustrating a client request setting value on which an initial installation work setting value is set.

An example of the delay execution instruction information 1600 as a processing result of the flowchart (FIG. 16) and an example in which the initial installation work setting value 1100 is set in the client request setting value 1500 (FIG. 17) are illustrated.

(Case of Script 1000)

When the flowchart is executed using the script 1000, a client request setting value 1700a in which the delay execution instruction information 1600a and the initial installation work setting value 1100 are set is generated.

The delay execution instruction information 1600a includes a USB storage setting value 1602, a power supply management timer setting value 1603, and a device management setting value 1604. In the client request setting value 1700a, a file used with a command is a description to be acquired from the USB storage 102. Thus, a network setting value 1701a remains the original client request setting value. In a USB storage setting value 1702, a power supply management timer setting value 1703, and a device management setting value 1706, values described in the initial installation work setting value 1100 are set. On the other hand, installation location information 1704 and a screen display setting 1705 as other setting values remain the original client request setting value.

(Scripts 1000 and 1003b)

When the flowchart according to the present exemplary embodiment is executed using a script to which the scripts 1000 and 1003b are additionally set, delay execution instruction information 1600b and a client request setting value 1700b in which the initial installation work setting value 1100 is set are generated.

The delay execution instruction information 1600b includes a network setting value 1601, a USB storage setting value 1602, a power supply management timer setting value 1603, and a device management setting value 1604. In the client request setting value 1700*b*, a setting value for acquiring a file to be used with a command is a setting value with which a file to be used with a command is acquired from a network. Thus, a network setting value 1701*b* is also changed to the initial installation work setting value 1100. In a USB storage setting value 1702, a power supply management timer setting value 1703, and a device management setting value 1706, values described in the initial installation work setting value 1100 are set. On the other hand, installation location information 1704 and a screen display setting 1705 as other setting values are maintained.

As described above, the image forming apparatus becomes operable at a setting value corresponding to an initial installation work environment during execution of the script included in the installation instruction information in such a manner that the delay execution instruction information is generated in the processing for executing the installation instruction information and is executed after the initial instruction work is completed. After completion of the initial installation work, the setting value requested by the client can be set by the delay execution instruction information. Further, the initial installation work can be performed without setting the unnecessary setting value in the initial installation work setting value in accordance with the environment. Thus, time and labor of the operator for visually checking a setting result can be reduced.

With the above described configuration, the initial installation work of the image forming apparatus can become further efficient.

The above described configurations of various types of data and their contents are not limited thereto. The data can have various configurations and contents depending on their uses and purposes.

While an exemplary embodiment has been described above, the present invention can take exemplary embodiments as a system, an apparatus, a method, a program, or a storage medium, for example. More specifically, the present invention may be applied to a system including a plurality of devices, or may be applied to an apparatus including a single device. All configurations obtained by combining the exemplary embodiments are included in the present invention.

According to the above described exemplary embodiment, the installation instruction information can be generated without consideration of where a storage location of the installation instruction information is. Further, only required setting values can be temporarily used depending on the initial instillation work, the initial instillation work location, and the initial instruction information storage location. Thus, the operator does not need to understand all contents of setting values of the client. Therefore, the initial installation work can be implemented without reducing the work efficiency.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-195160, filed Sep. 25, 2014, which is hereby incorporated by reference herein in its entirety.

What is claimed is:

1. An image forming apparatus, comprising:
at least one processor;
at least one memory in communication with the at least one processor, having stored therein at least one program which when executed by the at least one processor causes the image forming apparatus to:
detect installation instruction information that at least includes a client request setting value that is to be set into the image forming apparatus and a script for causing the image forming apparatus to execute an initial installation work as specified, the initial installation work being a work of installing at least one program into the image forming apparatus and sequentially setting the client request setting value into the image forming apparatus;
carry out a search as to whether an initial installation work setting value that is to be set initially into the image forming apparatus is included in the installation instruction information or not;
save, in a case where the initial installation work setting value is found by the search, the client request setting value, that affects the initial installation work, into delay execution instruction information, and thereafter change the client request setting value into the initial installation work setting value;
determine, in a case where an attribute included in the initial installation work setting value is an attribute for changing the client request setting value into the initial installation work setting value, an acquisition location that is a location where the installation instruction information has been acquired; and
sequentially set the client request setting value to which the initial installation work setting value has been reflected into the image forming apparatus in accordance with the script, and, after completion of the initial installation work, set the delay execution instruction information into the image forming apparatus.

2. The image forming apparatus according to claim 1,
further sets, in a case where the initial installation work setting value is not found in the installation instruction information by the search, the client request setting value into the image forming apparatus without saving the client request setting value into the delay execution instruction information and without changing the client request setting value into the initial installation work setting value.

3. The image forming apparatus according to claim 1, wherein the initial installation work setting value at least includes a USB storage setting value for setting use with a connection of a USB memory to the image forming apparatus and a network setting value for setting a network to be connected to the image forming apparatus.

4. The image forming apparatus according to claim 3, wherein, in a case where the acquisition location is determined to be a USB storage, the USB setting value included in the client request setting value is saved into the delay execution instruction information, and the client request setting value is thereafter changed into the initial installation work setting value; and wherein, in a case where the acquisition location is determined to be a network, the network setting value included in the client request setting value is saved into the delay execution instruction information, and the client request setting value is thereafter changed into the initial installation work setting value.

5. The image forming apparatus according to claim 4, wherein, in a case where the acquisition location is determined to be a USB storage, the delay processing unit determines a resource acquisition location of resources that are necessary for executing the installation instruction information after changing the client request setting value into the initial installation work setting value; and wherein, in a case where the resource acquisition location of the resources is determined to be a network, the network setting value included in the client request setting value is saved into the delay execution instruction information.

6. The image forming apparatus according to claim 1, wherein the client request setting value is set into the image forming apparatus in accordance with the script, and after the completion of the initial installation work, a result of the completed initial installation work is stored into the USB storage or an external server.

7. A method for controlling an image forming apparatus, the method comprising:

detecting installation instruction information that at least includes a client request setting value that is to be set into the image forming apparatus and a script for causing the image forming apparatus to execute an initial installation work as specified, the initial installation work being a work of installing at least one program into the image forming apparatus and sequentially setting the client request setting value into the image forming apparatus;

searching as to whether an initial installation work setting value that is to be set initially into the image forming apparatus is included in the installation instruction information or not;

saving, in a case where the initial installation work setting value is found by the searching, the client request setting value, that affects the initial installation work, into delay execution instruction information, and thereafter change the client request setting value into the initial installation work setting value;

determining, in a case where an attribute included in the initial installation work setting value is an attribute for changing the client request setting value into the initial installation work setting value, an acquisition location that is a location where the installation instruction information has been acquired; and sequentially setting the client request setting value to which the initial installation work setting value has been reflected into the image forming apparatus in accordance with the script, and, after completion of the initial installation work, set the delay execution instruction information into the image forming apparatus.

8. A non-transitory computer readable storage medium storing a program for causing a computer to perform a method, the method comprising:

detecting installation instruction information that at least includes a client request setting value that is to be set into the image forming apparatus and a script for causing the image forming apparatus to execute an initial installation work as specified, the initial installation work being a work of installing at least one program into the image forming apparatus and sequentially setting the client request setting value into the image forming apparatus;

searching as to whether an initial installation work setting value that is to be set initially into the image forming apparatus is included in the installation instruction information or not;

saving, in a case where the initial installation work setting value is found by the searching, the client request setting value, that affects the initial installation work, into delay execution instruction information, and thereafter change the client request setting value into the initial installation work setting value;

determining, in a case where an attribute included in the initial installation work setting value is an attribute for changing the client request setting value into the initial installation work setting value, an acquisition location that is a location where the installation instruction information has been acquired; and sequentially setting the client request setting value to which the initial installation work setting value has been reflected into the image forming apparatus in accordance with the script, and, after completion of the initial installation work, set the delay execution instruction information into the image forming apparatus.

* * * * *